United States Patent [19]

Tsunekawa et al.

[11] Patent Number: 4,758,980
[45] Date of Patent: Jul. 19, 1988

[54] COMPUTER-CONTROLLED DOCUMENT DATA FILING SYSTEM

[75] Inventors: Shou Tsunekawa; Akio Okazaki, both of Yokohama, Japan

[73] Assignee: Kabushiki Kaisha Toshiba, Kawasaki, Japan

[21] Appl. No.: 26,300

[22] Filed: Mar. 16, 1987

[30] Foreign Application Priority Data

Mar. 14, 1986 [JP] Japan .................................. 61-56204

[51] Int. Cl.$^4$ ........................ G06F 15/16; G06F 13/00
[52] U.S. Cl. ...................................... 364/900; 382/61
[58] Field of Search ....... 364/200 ms file, 900 ms file; 382/61, 56; 235/375, 431, 436, 454

[56] References Cited

U.S. PATENT DOCUMENTS

| | | | |
|---|---|---|---|
| 4,408,181 | 10/1983 | Nakayama | 364/900 X |
| 4,553,261 | 11/1985 | Froessl | 382/61 X |
| 4,574,395 | 3/1986 | Kato | 364/900 X |
| 4,684,997 | 8/1987 | Romeo et al. | 358/263 |

OTHER PUBLICATIONS

"The Logical Design of Operating Systems", Chapter 7 (p. 166–202), Alan C. Shaw, Prentice-Hall, Inc., 1974.

"Structural Pattern Recognition"; T. Pavlidis, Springer-Verlag, 1977.

Primary Examiner—Eddie P. Chan
Attorney, Agent, or Firm—Spivak, McClelland & Maier Oblon, Fisher

[57] ABSTRACT

In a data filing system, a data input unit converts an input document into an electrical image signal. A data processing unit sequentially performs multi-step image compression processing including a pattern recognition step. The processing unit includes subprocessors which independently execute corresponding image compression processing of higher processing levels. A data storage unit has a hierarchical memory structure, so that, when it receives compression image data of a given image processing level from the processing unit, it can store this data in accordance with its image processing level. A system controller causes, in the document registration mode, the first subprocessor of the data processing unit to execute image compression processing of a first level, and causes the data storage unit to store the resultant compression image data. The system controller causes the remaining subprocessors to intermittently execute the subsequent image compression processing during the idle time of the filing system.

8 Claims, 4 Drawing Sheets

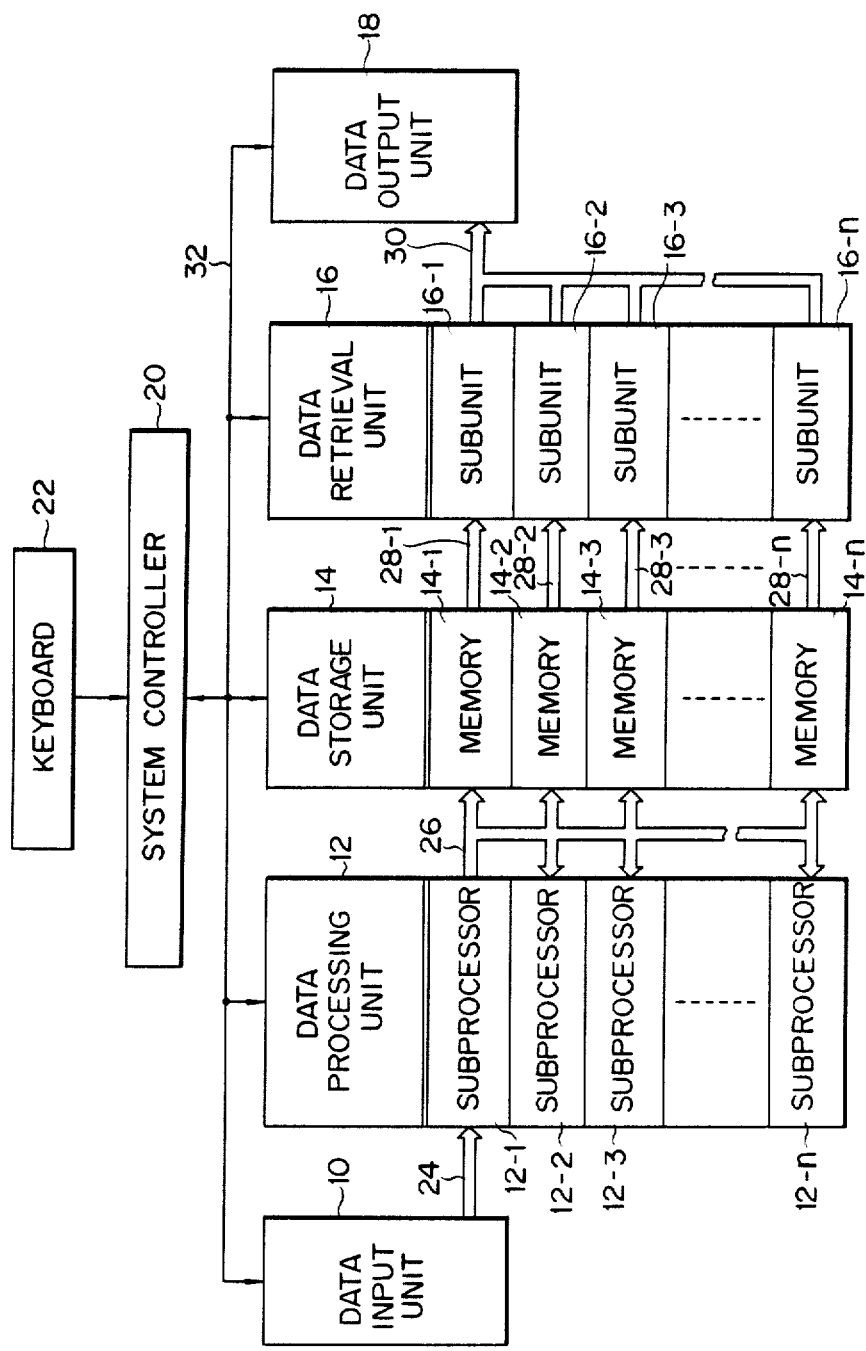

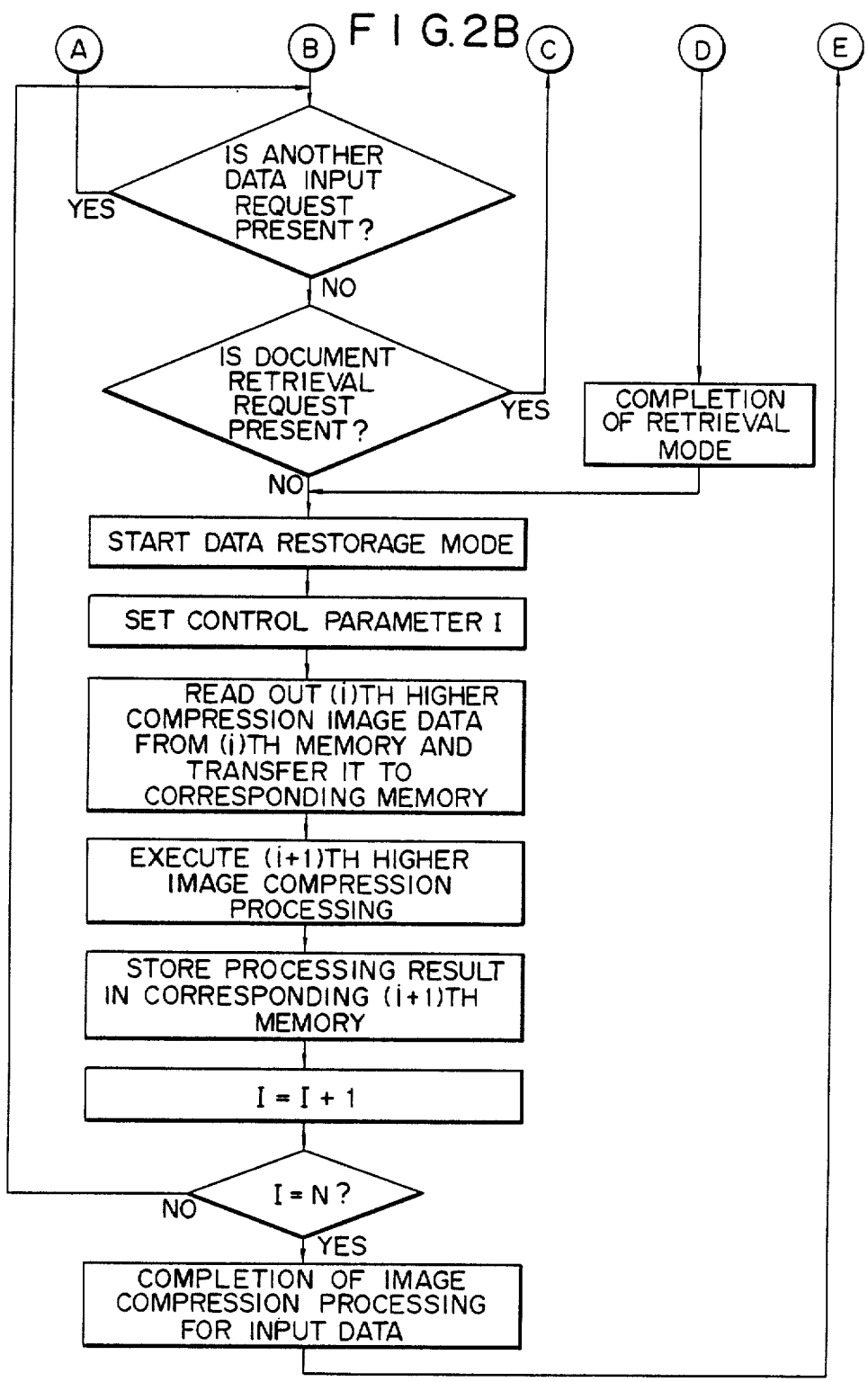

F I G. 3A
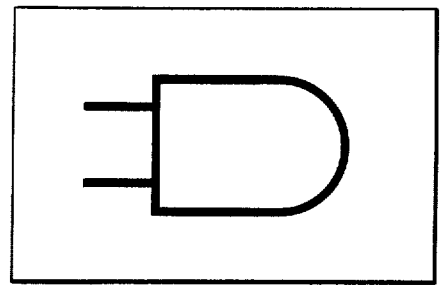
F I G. 3B
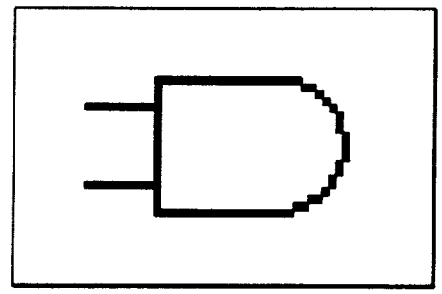
F I G. 3C
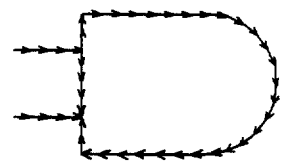
F I G. 3D
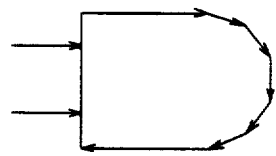

COMPUTER-CONTROLLED DOCUMENT DATA FILING SYSTEM

BACKGROUND OF THE INVENTION

The present invention relates to a data filing system and, more particularly, to a computer-controlled filing system for efficiently filing data such as design drawings, documents, and the like, and retrieving desired data, as required.

In recent years, an electronic filing system for storing a large volume of data in office, such as drawings, documents, and the like, in a large-capacity data storage unit has been developed. In a system of this type, various types of documents can be efficiently filed in accordance with the memory capacity of the data storage unit, and a desired document can be searched for and extracted by an operator under the control of a computer, as needed. In general, an appropriate identification code or codes are added to an input document as a management code, and in a document retrieving mode, the required document is searched for, from among the large volume of stored document data, in accordance with the code.

In a data-filing system with the conventional arrangement, although the data-filing/retrieving operation can be efficiently performed at high speed, it is performed on the basis of the above-mentioned management code and can therefore be performed only in units of documents. For example, a desired drawing (such as a circuit diagram) can be extracted from among a large volume of stored drawing data. However, it is difficult to directly retrieve only part of a drawing, such as a symbol or mark of a given drawing (e.g., a unit circuit serving a predetermined function, such as an AND gate). This is because the filing system does not "understand" the content of storage documents. If the system were capable of understanding the contents of the storage drawings in the same way as the human brain, it would not be so difficult to specify, in which portion of which drawing a desired circuit is included, with certain accuracy under any retrieval condition. In the data-filing system, as long as the document filing/retrieving operation is performed based on the management code corresponding to a specific document, the above-mentioned flexible mode retrieval cannot be performed.

If a recently developed automatic pattern recognition technique is applied, the data filing/retrieving operation can be performed in a flexible manner as mentioned above. In this case, the pattern feature of a paper document of an input drawing is automatically recognized (pattern-recognized), and is electronically coded. As a result, storage data can be compressed and stored at high level, and desired partial image data can be directly retrieved.

With such an intelligent data-filing system, however, it is an important technical problem to render storage data compact and improve operating speed. With the advance and growth in complexity of the automatic pattern recognition technique, recognition performance and precision have been improved. If a pattern recognition processing function is provided in a filing system, the pattern feature of an input paper document can be automatically recognized in the system, and a partial figure pattern can be converted to a simple recognition code. For example, when the pattern feature of each unit circuit (e.g., an AND gate) constituting a circuit drawn on a circuit diagram is pattern recognized, the content of the paper document is converted to an electronic code of several digits. Then, the data volume necessary for representing an identical information volume can be greatly decreased and hence the total storage data can be rendered compact. Therefore, drawing data to be stored in the filing system can be compressed to a higher level, and the final storage data can be rendered compact. However, a great deal of time is required to compress image data to a high level. This is because, in order to obtain highly compressed data, various data compression processing operations must be repetitively and sequentially executed for each image pattern. Therefore, in a current intelligent data-filing system, the conflicting requirements of compact storage data and high operating speed of data compression processing cannot be satisfied at the same time.

SUMMARY OF THE INVENTION

It is therefore an object of the present invention to provide a new and improved data-filing system which can highly compress and store input data, and yet improve the processing speed for input data registration.

In accordance with the above object, the present invention is addressed to a specific data filing system which performs a plurality of types of operations including a document registration mode and a document retrieval mode. The data filing system includes an input unit, a data processing unit, a data storage unit, and a retrieval unit. The input unit converts a paper document to be filed into an electrical image signal. The data processing unit is connected to the input unit, and performs, for the image data, predetermined signal processing such as image compression processing consisting of a plurality of subprocessing steps including an automatic pattern recognition step. Then, the processing unit sequentially produces processing result data, such as compression image data, having a plurality of processing levels. The data processing unit includes a plurality of subprocessors which independently execute the subprocessing steps. The data storage unit is connected to the data processing unit. When the storage unit receives compression image data having a given compression level, it stores the data. The storage unit comprises a hierarchical data storage apparatus having a plurality of memories connected to corresponding subprocessors. A system controller is connected to the above-mentioned units, and controls their operations. When the image signal is supplied from the input unit to the data processing unit in the document registration mode, the system controller causes the processing unit to execute image compression processing of a first level, and causes the first memory of the storage unit to store the resultant compression image data of the first level. The system controller then controls the data processing unit such that the subsequent subprocessors intermittently execute the image compression processing of the subsequent levels during the idle time of the filing system, whereby the time required for image compression processing for document registration is shortened and, hence, a document filing operation can be performed at high speed.

The invention, and its objects and advantages, will become more apparent in the detailed description of a preferred embodiment presented below.

BRIEF DESCRIPTION OF THE DRAWINGS

In the detailed description of a preferred embodiment of the present invention presented below, reference is made to the accompanying drawings of which:

FIG. 1 is a block diagram schematically showing the entire arrangement of an intelligent data filing system according to the preferred embodiment of the present invention;

FIGS. 2A and 2B form a flowchart showing execution sequences of a document registration mode and a retrieval mode executed by the data filing system shown in FIG. 1; and FIGS. 3A to 3D are representations showing examplary input image patterns which are sequentially produced in accordance with hierarchical image compression processing of the present invention.

DETAILED DESCRIPTION OF THE PREFERRED EMBODIMENT

Figure 2A:
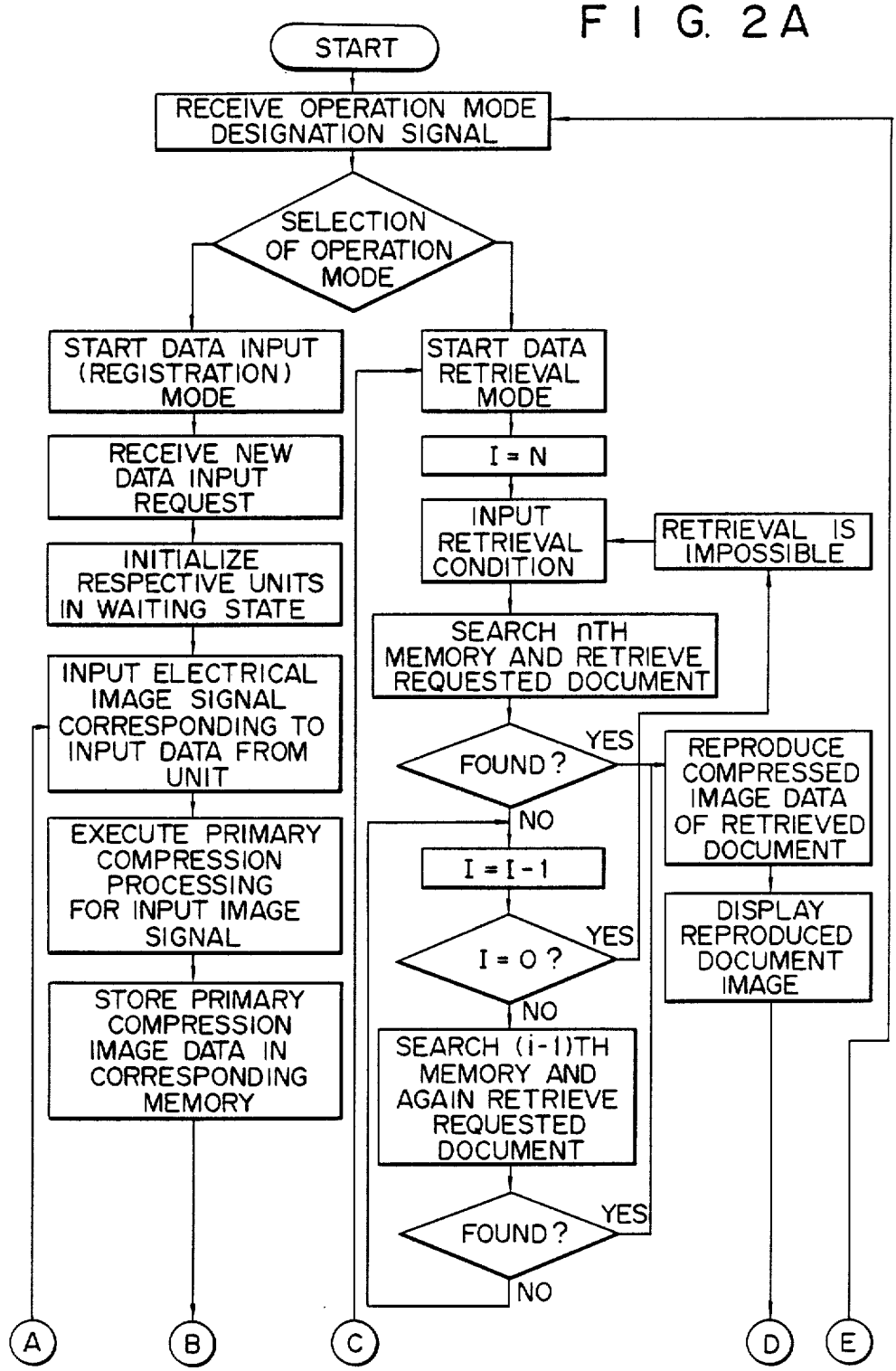

FIG. 1 schematically illustrates the entire arrangement of an intelligent data-filing system according to an embodiment of the present invention. The filing system includes data input unit 10, data processing unit 12, data storage unit 14, data retrieval unit 16, and data output unit 18. These units 12, 14, 16, and 18 are managed to appropriately execute any of (1) a data registration (input) mode, (2) a data restorage mode, and (3) a data retrieval mode under the control of system controller 20. Keyboard 22 is arranged as a man-machine interface for the inputting of commands (e.g., an operation mode setting command, a control condition updating request, etc.) to the system by an operator. The operator's command signals input through keyboard 22 are supplied to controller 20.

Data input unit 10 is preferably comprised of an image scanner, which optically scans input paper documents to be stored in the filing system, such as business documents, design drawings, etc., and produces corresponding electrical image data signals. Thus, the paper documents are converted to electrical image data, and are then introduced to the system.

Data input unit 10 is connected to data processing unit 12 having a hierarchical memory structure, through unidirectional data bus 24. Data processing unit 12 receives input image data, and compresses the input image data step by step in accordance with a predetermined processing schedule. Data processing unit 12 includes compression processing subprocessors 12-1, 12-2, 12-3, . . . , 12-$n$ for hierarchically executing a plurality of types of multi-step image compression processing from lower to higher levels. In this embodiment, first subprocessor 12-1 comprises a circuit for compressing input image data in accordance with the Modified READ (MR) method (this method is popular as an image compression method particularly in a facsimile system) known to those skilled in the art to which the present invention belongs. Second subprocessor 12-2 recognizes the pattern feature of input image data in accordance with a predetermined pattern recognition technique, and produces chain-coded line-segment data. Third subprocessor 12-3 converts the chain-coded line-segment data into vector data to further compress the pattern recognized image data. The chain coding method used in the pattern recognition is a known art, and is disclosed in, e.g., T. Pavlidis, "Structural Pattern Recognition", Springer-Verlag Berlin Heidelberg, New York (1977), pp. 161-164. Nth subprocessor 12-$n$ shown in FIG. 1 finally recognizes element figure patterns or character patterns constituting figure or character data in an input paper document, and converts them to corresponding microcodes. For example, in a circuit design drawing, if circuit elements represented by a series of vector data correspond to a figure pattern of an AND gate, these vector data are compressed to a simple code of several digits. An input image pattern is compressed, step by step, by the image data compression processing sequentially executed by these subprocessors.

Data processing unit 12 is connected directly to data storage unit 14 having a hierarchical memory structure. Data storage unit 14 has memories 14-1, 14-2, 14-3, . . . , 14-$n$ which have capacities and characteristics corresponding to the respective steps of image compression processing in data processing unit 12, and are hierarchically arranged. These memories 14-1, 14-2, 14-3, . . . , 14-$n$ are provided in correspondence with subprocessors 12-1, 12-2, 12-3, . . . , 12-$n$ of data processing unit 12. These memories may be formed of identical types of memories. However, in this embodiment, memories 14-1 to 14-$n$ are formed of optical disk devices, magnetic disk devices, and the like.

Data bus 26 is arranged between data processing unit 12 and data storage unit 14. Output data from each subprocessor of data processing unit 12 is transferred to the corresponding memory of data storage unit 14 through data bus 26. Data transfer is performed in the following manner. Output data from first subprocessor 12-1 is supplied to first memory 14-1, and data read out from first memory 14-1 is supplied to second subprocessor 12-2 for the next data processing. Output data from second subprocessor 12-2 is supplied to second memory 14-2, and data read out from second memory 14-2 is supplied to third subprocessor 12-3 for the next data processing. Data bus 26 defines the data transfer as above, and output data from last subprocessor 12-$n$ is supplied to memory 14-$n$. The data transfer direction according to the hierarchical memory structure of such storage unit 14 is fixed.

Data storage unit 14 is connected to data retrieval unit 16 through unidirectional data buses 28 so that the hierarchical memories of storage unit 14 are respectively connected to subunits 16-1, 16-2, 16-3, . . . , 16-$n$. When compression image data stored in a given memory of storage unit 14 is retrieved, data which is obtained by accessing the storage data of the memory is transmitted to corresponding subunit 16-1, 16-2, 16-3, . . . , or 16-$n$ through the corresponding data bus.

Data retrieval unit 16 is connected to data output unit 18 through unidirectional data bus 30. Under the control of system controller 20, data retrieval unit 16 retrieves and extracts a desired partial or entire image pattern requested by the operator, based on image reproduction processing corresponding to image compression processing including pattern recognition performed by data processing unit 12. Data bus 30 has bus lines connected to the subunits of data retrieval unit 16 and a bus line connected to data output unit 18. Retrieved data output from any subunit can be commonly transferred to data output unit 18. Data output unit 18 includes a known display unit (not shown) and an image data output terminal such as an image printer (not shown), and produces a soft copy and/or a hard copy of the retrieved image data.

Units 10, 12, 14, and 18 communicate with system controller 20 through control signal line 32. Controller 20 includes a CPU or central processing unit (not shown) for performing time-sharing control defined by a software program on a specific operating system. Controller 20 supplies a control signal to the corresponding unit or units through line 32 in order to control the respective units in an operation mode designated through keyboard 22, as will be described in detail with reference to the flowchart shown in FIG. 2.

The data filing system according to the embodiment of the present invention is operated in the following operation modes.

Data Input (Registration) Mode and Data Restorage Mode

When the data input (registration) mode is selected by keyboard 22 which is operated manually by the operator, controller 20 supplies a control signal (command signal) to the corresponding unit, through line 32, for forcibly interrupting the processing currently performed in the respective units. Therefore, data processing unit 12, data storage unit 14, and data retrieval unit 16 are set in a standby state for registering document image data.

When a paper document to be filed in the system, such as a design drawing of a digital circuit, is set on input unit 10, input unit 10 produces electrical image data representing the entire figure pattern of the drawing. The output image data from input unit 10 is supplied directly to first subprocessor 12-1 of data processing unit 12 connected to the output of unit 10. Subprocessor 12-1 compresses the input image data in accordance with the known MR method. At this time, if additional data (provided to the input image data) such as a keyword is input through keyboard 22, the compression image data is stored in first memory 14-1 of storage unit 14 together with the additional data. A careful attention must be paid to the fact that the compression image data is temporarily stored in corresponding memory 14-1 after the primary image compression processing by the MR method. The image data input processing at this step can be performed at high speed even if an input drawing pattern is complex, since the processing can be simultaneously performed at relatively high speed without being influenced by the input pattern. In this step, the primary compression processing of the input image data is completed.

In this step, controller 20 checks if a subsequent registration request or retrieval (interrupt) request for another paper document is present. If the registration request for another document is present, the same operation as described above is repeated for the other input document, as is shown in the flowchart shown in FIG. 2. If there is a request for retrieving given document data from the file data stored in the system, controller 20 sets the system in the retrieval mode, and performs the document retrieval operation (to be described later).

If there is no registration or retrieval request for another paper document, in other words, if the system operation is in an idle state (the system is set in the waiting state), controller 20 controls the respective units so as to perform further image compression processing (restorage mode) for the above input image data. More specifically, controller 20 initializes control parameter I to be "1". Next, controller 20 checks if the image data compressed by the MR method (primary compression image data) is stored in first memory 14-1 of data storage unit 14. If the primary compression image data is detected, second subprocessor 12-2 of processing unit 12 reads out the primary compression image data temporarily stored in first memory 14-1 under the control of controller 20. Thus, the primary compression image data is transferred from memory 14-1 to subprocessor 12-2 through data bus 26. Second subprocessor 12-2 performs secondary compression processing for the input image data (in this embodiment, chain-coding processing of line segments of the input image data in accordance with a specific pattern recognition technique). The chain-coded data of line segments produced by subprocessor 12-2 is transferred to and is stored in corresponding special-purpose submemory 14-2 as the secondary compression image data of the input image. Controller 20 increases control parameter I by "1" (I=I+1).

Upon completion of the secondary compression processing, controller 20 again checks if there is a registration request for another paper document to the filing system or a retrieval request. If one of these requests is detected, controller 20 controls the respective units so that the designated operation mode has the highest execution priority (in the flowchart shown in FIG. 2, this step is simplified into one block). At this time, if there is no registration request for another paper document or no retrieval request and the system operation still has an idle time (the system is set in the waiting state), controller 20 controls the respective units so as to execute still further image compression processing (restorage mode) for the above input image data. In this case, controller 20 first checks if control parameter I+1 (i.e., 2), after incrementation, has reached number N corresponding to the predetermined number of steps of image compression processing. If I<N, the secondary compression image data is read out from second memory 14-2, and is subjected to tertiary image compression processing (in this embodiment, conversion of the chain-coded line segment data to vector data).

The following image compression processing to higher levels is sequentially executed under the control of controller 20, in accordance with the above-mentioned sequence, as long as a request for the execution of a specific operation mode is not entered into the system. Meanwhile, ith-higher compression image data obtained from ith subprocessor 12-i is stored in corresponding ith submemory 14-i. Upon completion of ith-higher compression processing, control parameter I is incremented by "1" (processing of I=I+1).

If I=N is detected (i.e., in this embodiment, when the element figure pattern or character pattern constituting figure or character data of an input paper document is finally recognized by nth (final-stage) subprocessor 12-n, and the corresponding microcodes are stored in nth memory 14-n), all the compression processing for this input image data is completed, and the system is reset to the initial state.

During the process of executing the stepwise image data compression processing, careful attention should be paid to the following matter. When an input operation of a plurality of documents is designated, stepwise compression processing for each input document is performed in a substantially parallel manner. For example, when two documents A and B are sequentially registered or filed in the system, primary image compression processing is executed for these documents A and B, and primary compression image data A1 and B1 are sequentially produced. Compression image data A1 and B1 are stored in first memory 14-1 in storage unit 14. As long as the operator does not request the execution of another operation mode through keyboard 22 at this time, image compression processing of the next higher levels is sequentially performed by subprocessors 12-2, 12-3, . . . , for data A1 and B1, thus producing higher level compression image data pairs A2 and B2, A3 and B3, . . . . When registration of another input document is designated at this time, image compression processing for this new input document is performed with priority. For example, when tertiary compression image data A3 and B3 of documents A and B are stored in submemory 14-3, if registration of another document C is requested, compression processing of the next level for tertiary compression image data A3 and B3 is temporarily interrupted until the tertiary image compression processing of document C is completed and tertiary compression image data C3 is stored in submemory 14-3. After image data of all the input documents are compressed at the third level, fourth higher image compression processing is executed for last compressed data A3, B3, and C3. At this time, when new document D is input, image compression processing for document D is performed in the same parallel manner as described above.

As another example, while image compression processing of next higher levels is sequentially performed for compression image data A1 and B1 stored in first submemory 14-1 by subprocessors 12-2, 12-3, . . . , if registration of new input document C is requested, for example, if data A2 is stored in submemory 14-2 but data B2 has not yet been calculated, compression processing for documents A and B is temporarily interrupted, and primary compression processing for document C is performed first. As a result, secondary compressed image data A2 of document A is stored in submemory 14-2, and primary compression image data B1 and C1 of documents B and C are stored in submemory 14-1. At this time, as long as the operator does not request execution of another operation mode, secondary image compression processing is performed for primary compression image data B1 and C1 by subprocessor 12-1, and thus secondary compression image data A2, B2, and C2 of documents A, B, and C are stored in submemory 14-2. The execution sequence of the following compression processing is the same as described above.

Data Retrieval Mode

When the operator requests data retrieval through keyboard 22, system controller 20 controls units 12, 14, 16, and 18 so as to execute the retrieval mode prior to other processing operations. At this time, controller 20 initially sets control parameter I to be N. Number "N" represents the number of image compression steps described above. Setting control parameter I=N at the beginning of the retrieval operation means that all the input document data are already subjected to the final-step (nth-higher) image compression processing and stored in nth submemory 14-n of storage unit 14.

At this time, controller 20 displays questions asking for retrieval data which specifies requested document data on the screen of a display unit (not shown in FIG. 1) included in, e.g., data output unit 18. The retrieval data, i.e., code data such as a keyword for specifying a figure content of a desired document, is obtained such that the operator manually operates keyboard 22 to answer the displayed questions, and is transferred to controller 20 from keyboard 22. Controller 20 supplies identification code data to data retrieval unit 16.

Data retrieval unit 16 searches the content of submemory 14-n of data storage unit 14 to check if document data satisfying the condition of the input retrieval data (document data requested by the operator) is stored in submemory 14-n. If retrieval of the requested document data is successful in memory 14-n, in other words, if the document data requested by the operator is detected from the content of memory 14-n, retrieval unit 16 transfers a code signal indicating the presence of the target document data to controller 20 through signal line 32. In response to this signal, controller 20 reads out the compression image data of the retrieved document from storage unit 14, and controls data retrieval unit 16 so as to perform data reproduction processing. More specifically, the compression image data read out from submemory 14-n is supplied to corresponding subunit 16-n through special-purpose data bus 28-n. Subunit 16-n executes recovery (reproduction) processing of the compression image data in accordance with the image compression level of the supplied document data, and transfers the resultant document image signal to data output unit 18 through data bus 30. The reproduced image of the retrieved document data is presented to the operator in a known output format (e.g., a soft copy by means of the display unit and/or a hard copy by means of an image printer) by data output unit 18.

If, as a result of data access of last memory 14-n of storage unit 14, document data satisfying the condition of the designated retrieval data (the desired document data) 14-n (the retrieval in memory 14-n is unsuccessful), controller 20 decrements control parameter I by "1" (I=I−1). After it is confirmed that control parameter I has not reached zero after the decrement processing, data retrieval unit 16 performs the same document retrieval operation as above for a submemory (14-3, if n=4) positioned at a previous stage of the last retrieved submemory (14-n). Retrieval of different submemories in storage unit 14 is performed by different subunits in retrieval unit 16. For example, the document retrieval operation for memory 14-3 is performed by corresponding subunit 16-3. If a target document is detected, reproduction processing corresponding to the compression level of the document image is executed for the compression image data of the document detected by subunit 16-3. If no target document is detected, the retrieval processing is further continued in accordance with the flowchart shown in FIG. 2, in the same manner as described above.

When the control parameter is decremented to yield I=0, and if the target document data cannot be detected in storage unit 14, in other words, if a document requested by the operator cannot be retrieved despite that the document retrieval operation is executed for memories 14-n to 14-1, controller 20 determines that the document retrieval operation requested at that time is not possible, displays a message indicating this on the display unit of output unit 18, and then sets the system in the input waiting state of the next retrieval data. In this case, when the operator changes the form of retrieval data specifying the desired document, and inputs the changed data, the above-mentioned retrieval operation is repeated from the beginning. For example, after generic designation of the pattern feature of a desired drawing document proves unsuccessful, lower level retrieval data, i.e., more detailed retrieval conditions (including a character string which appears in the desired drawing, or the type and the number of figures) are supplied to the system, and the above-mentioned retrieval operation is repeated. In this case, since the number of retrieval conditions designated by the operator increases, the target document can be retrieved with higher probability.

FIGS. 3A to 3D illustrate a case wherein hierarchical compressed images of higher levels are sequentially obtained for a single input figure pattern in accordance with the above-mentioned data registration operation. FIG. 3A shows an original image as an input figure pattern symbolizing an "AND gate" popularly used in a logic circuit diagram. The original image is optically scanned by data input unit 10 shown in FIG. 1, and is primary compressed by subprocessor 12-1 in accordance with the MR method, thereby obtaining the compressed image shown in FIG. 3B. In FIG. 3B, the compressed image is illustrated as a coarse dot pattern in order to allow easy visual understanding. However, in practice, the compressed image is stored in memory 14-1 as a bit pattern in which bit codes "0" and "1" are determined in accordance with the presence/absence of line segments of the pattern. The primary compressed image is further compressed by subsequent subprocessor 12-2, and a chain-coded data string shown in FIG. 3C is obtained. More specifically, black pixels corresponding to the line segments are extracted from the input pattern, and lines of the extracted black pixels are represented by a series of partial codes selected from predetermined reference direction codes. When the compressed image shown in FIG. 3C is subjected to the compression processing by next subprocessor 12-3, it is converted to a compressed image of higher level. In this case, since the line segments of the input pattern are represented by vectors, as is shown in FIG. 3D, partial segments divided from the line segments are expressed at their two end portions by coordinates (xi,yi) of the orthogonal coordinate system. In this manner, as the compression processing progresses toward higher levels, understanding of the input pattern gradually approximates human understanding, and the pattern is finally recognized to be an "AND gate".

According to the embodiment of the present invention, when one or a plurality of input documents are subjected to primary image compression processing in the data input (registration) mode, they are compressed and are temporarily stored in data storage unit 14 of the filing system. Since the primary image compression processing is relatively simple processing without requiring complex arithmetic operations, it can be executed at a relatively high speed. Therefore, the operation of storing the compression image data in this step can be completed in a short period of time. The secondary image compression processing and thereafter are sequentially performed step by step by utilizing the idle time of the filing system (while no processing request is made by the operator). If after the primary image compression processing is completed, the operator requests the execution of another operation mode, the subsequent image compression processing is automatically interrupted and the requested operation mode is executed prior thereto. Therefore, the time occupied by image compression and storage processing for data registration can be shortened, thereby greatly improving the processing speed for input data registration.

The image data of the input document is converted to compression image data of higher levels, and is stored in the submemories of the corresponding levels. When document retrieval is requested during the document registration process, the target document can be automatically retrieved and reproduced by data retrieval unit 16 under the control of controller 20, irrespective of the level of the image data of the corresponding document and the memory in storage unit 14 which stores the compression image data. Therefore, by adopting the stepwise document registration method described above, the data retrieval processing performance will not be adversely influenced at all. Therefore, high efficiency can be expected in the document retrieval operation, in addition to high-speed document registration.

In the system of the above embodiment, in the data registration mode, the stepwise image compression processing for a plurality of different documents is performed in a parallel manner, so that compression image data of different documents (e.g., A, B, and C) can have the same compression level (e.g., A2, B2, and C2). Therefore, variations in compression level of the compression image data of these input documents can be minimized, and this contributes to efficiency of the subsequent document retrieval.

What is claimed is:

1. A data filing apparatus for performing a plurality of types of operations including a document registration mode and a document retrieval mode, comprising:
   (a) input means for converting a paper document to be filed into an electrical image signal;
   (b) signal processing means, connected to said input means, for performing, for the image signal, predetermined step-by-step signal processing in accordance with a predetermined processing schedule consisting of a plurality of subprocessing steps including a pattern recognition step, said signal processing means including subprocessors for hierarchically executing said subprocessing steps from a first to a high level by having higher levels of subprocessors receiving the processing results from the lower level subprocessors;
   (c) storage means, connected to said signal processing means, for storing, when processing result data having a given processing level is supplied from said signal processing means, the processing result data, said storage means including a hierarchical data storage device having memories which are connected to the corresponding subprocessors and define a hierarchical memory structure; and
   (d) control means, connected to said input means, said signal processing means, and said storage means, for causing said signal processing means, when an input operation of a plurality of documents is supplied from said input means to said signal processing means in the document registration mode, to execute signal processing of a first level, causing said storage means to store the processing result data of the first level in a first memory thereof, and controlling said signal processing means so as to intermittently execute signal processing of a second level and subsequent higher levels by the remaining subprocessors of said signal processing means when there is no registration or retrieval request for another paper document.

2. The apparatus according to claim 1, wherein when an operator requests execution of another operation mode while signal processing of a level subsequent to the first level is executed by the corresponding subprocessor of said signal processing means, the processing result data obtained at that time is temporarily stored in the corresponding memory of said storage means, and the requested operation mode is executed prior to the completion of the execution of said signal processing.

3. The apparatus according to claim 2, wherein said subprocessors of said signal processing means parallel-execute stepwise signal processing for each document when registration of a plurality of documents is requested.

4. The apparatus according to claim 3, further comprising:
(e) retrieval means for sequentially retrieving an image signal corresponding to a target document requested by an operator from the highest level memory to the first level memory in said storage means in the document retrieval mode, and reproducing an image signal of the retrieved document.

5. The apparatus according to claim 4, wherein said retrieval means includes subunits, connected to said memories, for performing a retrieval operation corresponding to the processing level of an image signal stored in the corresponding memory.

6. The apparatus according to claim 5, wherein said memories hierarchically arranged in said storage means comprise different types of data recording apparatuses.

7. The apparatus according to claim 6, further comprising:
(f) first data bus means, arranged between said signal processing means and said storage means, for bidirectionally transferring data therebetween; and
(g) second data bus means, arranged between said storage means and said retrieval means, for unidirectionally transferring data therebetween.

8. The apparatus according to claim 7, further comprising:
(h) output means, connected to said retrieval means, for receiving and displaying the reproduced image signal of a document which is searched for by said retrieval means under the control of said control means.

* * * * *

UNITED STATES PATENT AND TRADEMARK OFFICE
CERTIFICATE OF CORRECTION

PATENT NO. : 4,758,980

DATED : Jul. 19, 1988

INVENTOR(S) : Shou TSUNEKAWA, et al.

It is certified that error appears in the above-identified patent and that said Letters Patent is hereby corrected as shown below:

--The entry for "Attorney, Agent, or Firm" should read:
  --Oblon, Fisher, Spivak, McClelland & Maier, P.C.--

Signed and Sealed this

Fourteenth Day of February, 1989

Attest:

DONALD J. QUIGG

*Attesting Officer*  *Commissioner of Patents and Trademarks*